(12) United States Patent
Tonar et al.

(10) Patent No.: US 6,193,379 B1
(45) Date of Patent: Feb. 27, 2001

(54) ELECTROCHROMIC ASSEMBLY INCLUDING AT LEAST ONE POLYMERIC SUBSTRATE

(75) Inventors: William L. Tonar; Michael J. Van Ast, both of Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/595,072

(22) Filed: Jun. 9, 2000

(51) Int. Cl.$^7$ ........................................... G02B 5/08
(52) U.S. Cl. .................... 359/603; 359/604; 359/605; 359/265; 359/267
(58) Field of Search .......................... 359/603, 604, 359/605, 265, 267, 269, 270, 271, 273

(56) References Cited

U.S. PATENT DOCUMENTS

| | | | |
|---|---|---|---|
| 4,331,385 | * 5/1982 | Kondo et al. | 359/265 |
| 4,735,855 | * 4/1988 | Wofford et al. | 428/349 |
| 4,737,379 | 4/1988 | Hudgens et al. | 427/39 |
| 5,471,338 | 11/1995 | Yu et al. | 359/273 |
| 5,672,440 | * 9/1997 | Bailey | 429/93 |
| 5,680,245 | 10/1997 | Lynam | 359/265 |
| 5,724,176 | 3/1998 | Nishikitani et al. | 359/271 |
| 5,724,187 | 3/1998 | Varaprasad et al. | 359/608 |
| 5,798,860 | 8/1998 | Yu et al. | 359/265 |
| 6,020,987 | * 2/2000 | Baumann et al. | 359/273 |

OTHER PUBLICATIONS

Mitsui Chemicals/Products Information (4 pgs.) http://mitsui–chem.co.jp/english/info/kinoi.htm (Dec. 2, 1998).
TPX information (1 pg.) http://www.commercialplastics.com/eng4.html (Dec. 2, 1998).
TPX information (1 pg.) http://www.commericalplastics.com/engsec11.html (Dec. 2, 1998).
TPX information (1 pg.)http://sbfel3.ucsb.edu/optical_transport/tpx.html (Dec. 2, 1998).
Development of DCPD Type Epoxy Resin (1 pg.) http://dicwww01.dic.co.jp/tech/rev0302/index–e.html (Dec 3, 1998).
Nippon Zeon News Release (2 pgs.) http://www.zeon.co.jp/english/new/f/f–1219n6.html (Dec. 2, 1998).

* cited by examiner

Primary Examiner—Mohammad Y. Sikder
(74) Attorney, Agent, or Firm—Price, Heneveld, Cooper, DeWitt & Litton; Brian J. Rees

(57) ABSTRACT

An electrochromic assembly includes a transparent front element and a rear element each having front and rear surfaces. At least one of the front and rear elements is made from a plastic that maintains its integrity when exposed to organic solvents. A layer of transparent conductive material is disposed on the rear surface of the front element. A layer of conductive material is also disposed on the front surface of the rear element. The front element and the rear element when joined form a chamber therebetween. The chamber contains at least one electrochromic material in solution with the organic solvent, which is effective to attenuate light passing therethrough.

50 Claims, 13 Drawing Sheets

ELECTROCHROMIC ASSEMBLY INCLUDING AT LEAST ONE POLYMERIC SUBSTRATE

BACKGROUND OF THE INVENTION

This invention relates to an electrochromic assembly and more specifically to electrochromic mirrors and windows.

Electrochromic mirrors and windows have historically been constructed with glass elements. Electrochromic mirrors that are typical of modern day automatic rearview mirrors for motor vehicles are disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D.A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al., each of which patents is assigned to the assignee of the present invention and the disclosures of each of which are hereby incorporated herein by reference.

In most cases, when the electrochromic medium (which functions as the media of variable transmittance in mirrors and windows) is electrically energized, it begins to absorb light. The more light the electrochromic medium absorbs, the darker the window or mirror appears. When the electrical voltage is decreased to zero, the mirror or window returns to its clear high reflectance state or fully transmissive state, respectively. In most commercially-produced electrochromic mirrors, the electrochromic medium sandwiched and sealed between the two glass elements is comprised of a solution-phase and a self-erasing system of electrochromic materials. Other electrochromic media may be utilized. Those media include an approach wherein a tungsten oxide electrochromic layer is coated on one electrode with a solution containing a redox active material to provide the counter electrode reaction.

When operated automatically, the electrochromic assembly of the indicated character, when implemented as a window, can incorporate light-sensing electronic circuitry, which is effective to change the electrochromic assembly to the absorbing modes when high ambient light levels are detected. The sandwiched electrochromic medium being activated and the transmissivity of the electrochromic assembly can be changed in proportion to the level of light that is detected. As the light level decreases, the electrochromic assembly automatically returns to its normal high transmission state. Alternatively, to reduce the air conditioning load on a building, the windows on the sides of the building exposed to direct sunlight can darken automatically and return to their normal high transmission state when in the shade.

When the electrochromic assembly is implemented as a mirror, the conductive layers on both the front glass element and the rear glass element are connected to electronic circuitry, which is effective to electrically energize the electrochromic medium to allow the mirror to relieve glare from the mirror.

The electrochromic medium fills a sealed chamber that has been defined by a ransparent front glass element, a peripheral edge seal and a rear glass element (that may include a reflective layer). Conductive layers have been provided on the inside of the front and rear glass elements. The conductive layer on the front glass element has been transparent while the conductive layer on the rear glass element may be transparent or may be semi-transparent or opaque and may also have reflective characteristics and function as a reflective layer for a mirror assembly.

Non-planar electrochromic mirrors have historically been manufactured by heating a planar glass substrate and bending it into the desired shape. Such non-planar mirrors are commonly used for some outside rearview mirror assemblies. Problems arise, however, in electrochromic mirror assemblies using two glass elements, which must both be bent into conforming shapes. If the front surface of the rear element does not conform identically to the rear surface of the front glass element, the spacing between the elements will not be uniform. This leads to non-uniform coloration of the electrochromic device in its low reflectance state. Additionally, such variations in curvature between the front and rear elements will introduce substantial image distortion into the reflected image. This problem becomes worse when the reflective layer of the mirror assembly is provided on the rear surface of the rear glass element.

To reduce the weight of the two glass element mirror assembly, the glass elements have been made using thinner glass substrates. Unfortunately, as the thickness of the glass is decreased, the individual glass elements become more fragile and flexible and are more difficult to bend accurately. Thin glass is also more difficult to bend accurately using conventional glass bending techniques.

It is therefore difficult to produce a commercially desirable non-planar electrochromic mirror that has two thin glass elements because each thin glass element will be much more likely to flex, warp, bow and/or shatter. Properties of a solution-phase electrochromic device, such as coloring and clearing times and optical density when colored, are dependent on the thickness of the electrochromic layer (e.g., the spacing between the two glass elements). Maintaining uniform spacing is necessary to maintain uniform appearance. The spacing between thin glass elements can be easily changed even after device manufacture by applying subtle pressure on one of the glass elements. This creates an undesirable non-uniformity in the appearance of the device.

While some prior art patents have suggested replacing a glass element with an element composed of a polymer, no electrochromic mirrors or windows incorporating a plastic element and containing a solution-phase electrochromic material have been commercially available. This is due, in part, to the fact that optical plastics have historically degraded with long term exposure to electrochromic materials, especially solution based electrochromic materials. For example, many optical quality lenses have been constructed of various transparent plastics (e.g., CR39, acrylics and various polycarbonates). However, such transparent plastics deteriorate when exposed to typical electrochromic solvents (e.g., propylene carbonate, ethylene carbonate, acrylonitrile, acetonitrile, dimethylformamide and dimethylsulfoxide) currently used in solvent-phase electrochromic assemblies. The vulnerable plastic could be overcoated with a protective layer but it is very difficult to produce guaranteed pin hole or defect free coatings in mass production.

SUMMARY OF THE INVENTION

The present invention is directed to an electrochromic assembly that includes a transparent front element and a rear element each having a front and a rear surface. At least one of the front and rear elements is made from a plastic that maintains its integrity when exposed to an organic solvent. A layer of transparent conductive material is disposed on the rear surface of the front element and a layer of conductive material is disposed on the front surface of the rear element. The front element and the rear element when joined, form a chamber therebetween. The chamber contains at least one electrochromic material in solution with the organic solvent, which is effective to attenuate light passing therethrough.

These and other features, advantages and objects of the present invention will be further understood and appreciated by those skilled in the art by reference to the following specification, claims and appended drawings.

DETAILED DESCRIPTION OF PREFERRED EMBODIMENTS

As previously stated, most optical plastics (such as CR39) currently in use do not stand up to polar organic or more broadly aprotic solvents (e.g., propylene carbonate, acrylonitrile, acetonitrile, dimethylformamide and dimethylsulfoxide) typically utilized in solution-phase electrochromic assemblies. However, transparent plastics that are aliphatic or olefinic in nature (e.g., polypropylene, polyethylene, dicylcopentadienes and polymethylpentenes) tend to perform quite well when exposed to electrochromic solvents. These transparent plastics also function well in solid-state systems that include pure solution-phase and partial solution-phase electrolytes or hybrid systems (tungsten oxide on one side with a solution-phase on the other). These transparent plastics include: cyclic olefin copolymers such as TOPAS® available from Ticona, LLC of Summitt, N.J.; polymethylpentenes such as TPX® manufactured by Mitsui; hydrogenated cyclo-olefin polymers such as ZEONEX® (based on dicyclopentadiene) manufactured by Nippon Zeon Company; and amorphous cycloolefin copolymers such as APEL™ manufactured by Mitsui. In general, non-polar plastics hold-up when exposed to electrochromic solvents.

One embodiment of the present invention is directed to an electrochromic assembly that includes front and rear elements that are made of a transparent plastic that does not degrade when exposed to aprotic solvents (e.g., acrylonitrile, acetonitrile and dimethylformamide). Broadly, these transparent plastics are aliphatic hydrocarbons in nature, which includes polyolefins (e.g., polyethylene, polypropylene and polymethylpentene). Using transparent plastics that are chemically resistant to propylene carbonate like solvents, in electrochromic assemblies, is desirable in that these plastic elements can be approximately one-third the weight of glass elements of the same thickness.

These plastics can be formed into various shapes and curvatures through injection molding which reduces scrap as compared to utilizing sheet products such as glass. Further, using injection molding typically allows the plastic elements to be formed flatter than glass elements. This also allows both the front and rear elements to be formed with a radius of curvature that is typically better than that which can be readily achieved with glass elements. Additionally, utilizing front and rear plastic elements allows the elements to be sealed without a separate seal (see FIGS. 3–7). This is accomplished by joining the front and rear elements by various welding techniques (e.g., thermal, ultrasonic or laser welding). These plastics are also machinable, which allows for a wider range of assembly techniques. For example, the plastic elements could be bolted together and sealed with a grommet. Additionally, multiple fill holes can be used and these holes can be advantageously welded shut.

Figure 1:
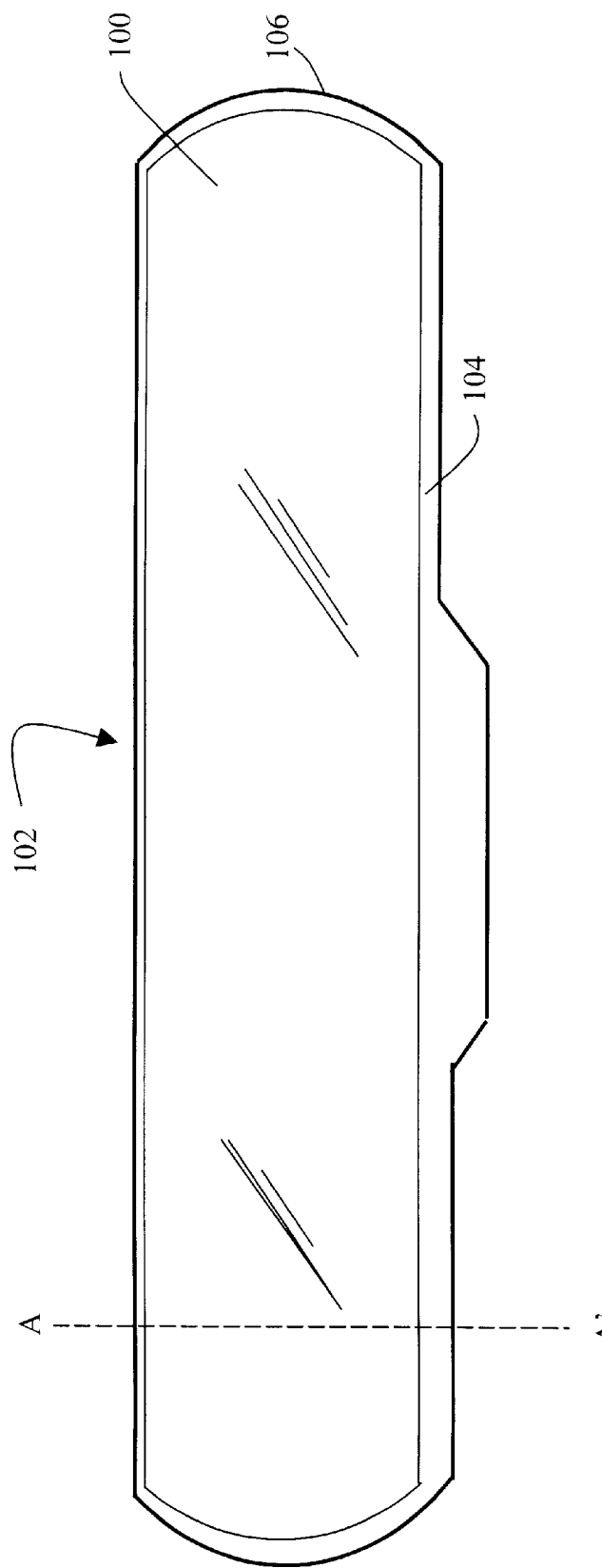
FIG. 1 is a front perspective view illustrating an inside rearview mirror for a motor vehicle which incorporates an electrochromic assembly, according to an embodiment of the present invention.

FIG. 1 shows a front view of an inside rearview mirror 102. The disclosed mirror assembly is adapted to be installed in a motor vehicle in a conventional manner such that the mirror faces the rear of the vehicle and can be viewed by the driver of the vehicle to provide a rearward view. Inside rearview mirror 102 may incorporate light-sensing electronic circuitry of the type illustrated and described in the above-referenced Canadian Patent No. 1,300,945; U.S. Pat. No. 5,204,778; or U.S. Pat. No. 5,451,822, and other circuits capable of sensing glare and ambient light and supplying a drive voltage to the electrochromic assembly 100. Additionally, inside rearview mirror 102 can be a non-planar mirror assembly.

As used and described herein, a "non-planar" surface includes, but is not limited to, convex spherical, convex cylindrical and aspheric surfaces as well as surfaces that are planar in one region and curved in another region. For example, a non-planar mirror may include a substantially planar electrochromic assembly having a curved end portion on the passenger side of the mirror and/or on the driver side of the mirror. Inside rearview mirror 102 generally, when fully cleared (non-energized), has a reflectance value of about 70 percent to about 80 percent or higher.

Rearview mirrors embodying the present invention normally include a bezel 104, which extends around the entire periphery of mirror assembly 100. The bezel 104 typically conceals and protects the bus clips (not shown), the peripheral edge portions of a sealing member (when utilized) and both the front and rear elements (described below). A housing 106 retains mirror assembly 100 and may be formed from the rear plastic element of the electrochromic assembly (see FIG. 8). A wide variety of bezel designs are well known in the art, such as, for example the bezel taught and claimed in above-referenced U.S. Pat. No. 5,448,397. There are also a wide variety of housings well known in the art for attaching the rearview mirror 102 to an inside front windshield of an automobile. Alternatively, housing 106, for rearview mirror 102, can be mounted to the automobile's roof. A housing for attaching an inside assembly is disclosed in above-referenced U.S. Pat. No. 5,337,948.

An electrical circuit preferably incorporates an ambient light sensor 962 (see FIG. 12) and a headlamp glare light sensor 964. Glare light sensor 964 is positioned either behind the mirror glass and looking through a section of the mirror with the reflective material completely or partially removed, or can be positioned outside the reflective surfaces, e.g., (in the bezel 104). Additionally, an area or areas of the electrode and reflector may be completely removed or partially removed in, for example, a dot or line pattern, to permit a vacuum fluorescent display, such as a compass, clock or other indicia, to show through to the driver of the vehicle. Commonly assigned U.S. Pat. No. 5,825,527, entitled "AN INFORMATION DISPLAY AREA ON ELECTROCHROMIC MIRRORS HAVING A THIRD SURFACE REFLECTOR," shows a presently preferred line pattern and is hereby incorporated by reference.

Alternatively, the reflector may be a transflector as disclosed in commonly assigned U.S. patent application No. 09/311,955, entitled "ELECTROCHROMIC REARVIEW MIRROR INCORPORATING A THIRD SURFACE METAL REFLECTOR AND A DISPLAY/SIGNAL LIGHT," filed on May 14, 1999, by William L. Tonar et al. The disclosure of this patent application is incorporated herein by reference.

Figure 2:
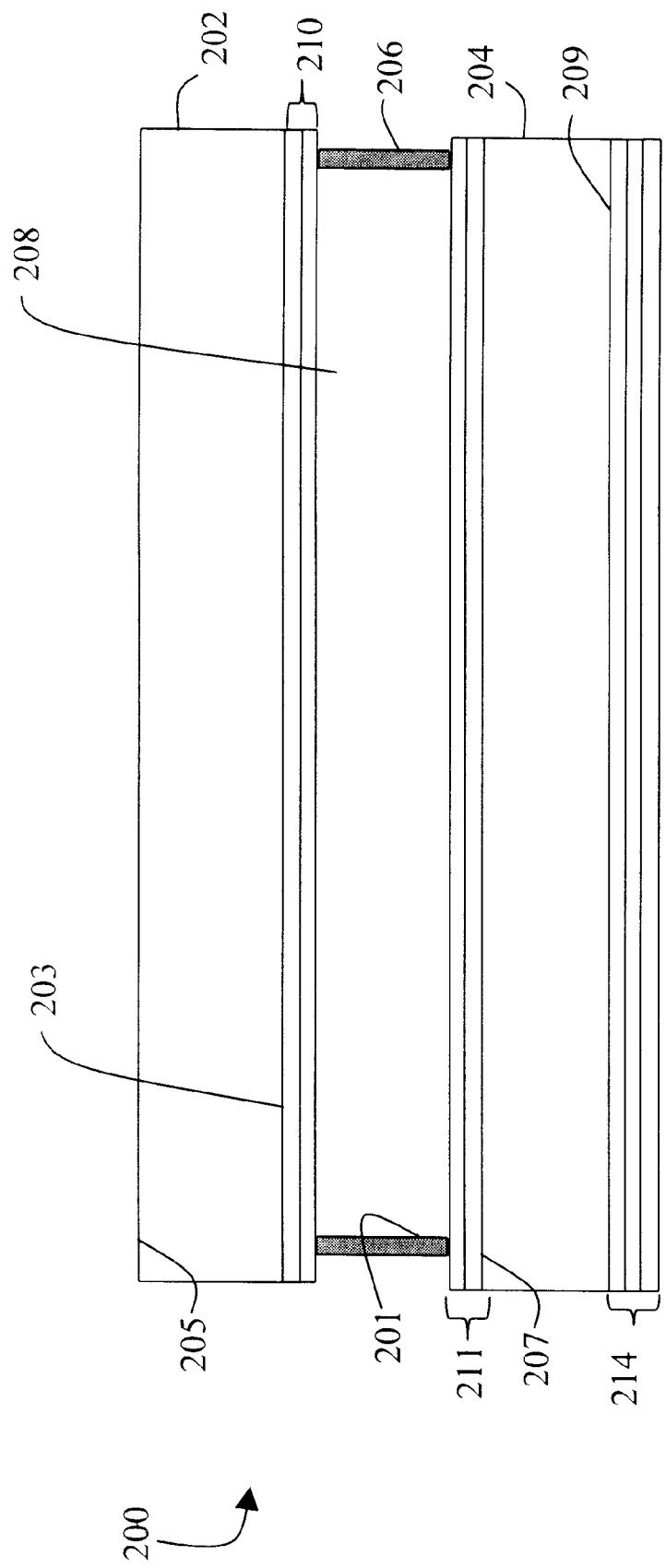
FIG. 2 is an enlarged cross-sectional view of an electrochromic assembly incorporated, for example, within the rearview mirror of FIG. 1 taken on the line A–A' thereof, according to an embodiment of the present invention.

FIG. 2 shows a cross-sectional view of an electrochromic assembly 200 taken along a line A–A' (similar to line A–A' of assembly 100 of FIG. 1). Electrochromic assembly 200 has a front transparent plastic element 202 having a front surface 205 and a rear surface 203, and a rear plastic element 204 having a front surface 207 and a rear surface 209. Since some of the layers of the mirror are very thin, the scale has been distorted for pictorial clarity. Also, for clarity of description of such a structure, the following designations will be used hereinafter. The front surface of the front plastic element will be referred to as the first surface and the back surface of the front plastic element as the second surface. The front surface of the rear plastic element will be referred to as the third surface and the back surface of the rear plastic element as the fourth surface.

Chamber 208 is defined by one or more layers of transparent conductive material 210 (disposed on front element rear surface 203), another material 211 disposed on rear element front surface 207 comprising either a transparent conductive material or a combination reflector/electrode, and an inner circumferential wall 201 of sealing member 206.

Preferably, electrochromic assembly 200 has plastic elements having a thickness of about 2.0 mm. As stated above, plastic elements typically result in a weight saving of about one-third over glass elements of the same thickness. This decreased weight ensures that the mechanisms used to manipulate the orientation of the mirror (when incorporated within exterior mirrors), commonly referred to as carrier plates, are not overloaded and further can provide significant improvement in the vibrational stability of the mirror assembly.

Front transparent plastic element 202 may be any plastic material which is thin and transparent and has sufficient strength to be able to operate in the conditions, (e.g., varying temperatures and pressures) and is chemically resistant to common electrochromic materials, commonly found in the automotive environment. As discussed above, front transparent plastic element 202 may comprise any type of polymer or plastic (or glass if desired) that is transparent in the visible region of the electromagnetic spectrum and that can withstand exposure to common electrochromic solvents. Front transparent plastic element 202 is preferably a molded polar plastic with a thickness ranging from about 1.5 mm to about 2.5 mm. Rear plastic element 204 must meet the operational conditions outlined above, except that it does not need to be transparent unless a fourth surface reflector is implemented or assembly 200 is a window.

Preferably, all surfaces of front and rear plastic elements 202 and 204 include an oxygen barrier layer that also serves as a hardcoat (the oxygen barrier is essentially the outer surface of the plastic elements). The oxygen barrier layer serves to slow oxygen, moisture vapor and other detrimental vapors and gases that may be within the plastic or that might migrate through the plastic from interacting with or adversely affecting the electrochromic medium within chamber 208. An example of an aliphatic or olefinic polymer with an oxygen barrier on it is Escal film made by Mitsubishi. Escal is made by applying a vacuum-deposited ceramic barrier layer on a polypropylene substrate. Another example of a good oxygen barrier is a multilayer organic/inorganic coating combination used on a product call Flexible Glass made by Vitex Systems, Inc. of Palo Alto, Calif.

Hardcoats (e.g., INPRO™, $Al_2O_3$ and $SiO_x$) function to protect the underlying plastic substrate from being scratched. Many hardcoats (e.g., $SiO_x$) are also good oxygen and solvent barriers. However, even a good oxygen and solvent barrier may have pin holes and eventually fail due to solvent migration through the pin hole undercutting the coating. The solvent will then attack large areas of the underlying plastic substrate if it is not chemically resistant to the solvent. As a general rule, the best oxygen barriers tend to be inorganic in nature. Various chemical resistant hardcoats can also function as oxygen barriers (e.g., $SiO_x$). The chemical resistant hardcoat also protects the plastic element from short exposures to various potentially damaging substances (e.g., gas, suntan oil and lotions). Oxygen barriers can also aid in the adhesion of conductive material to plastics such as polyolefins. Other examples of good organic oxygen barriers are polyvinylidene chloride (SARAN™, polyacrylonitrile (Barex™), ethylene vinyl alcohol (EVOH) and polyvinyl alcohol (PVA). Drawing or orientating olefins such as polypropylene or polyethylene improves oxygen barrier properties. Multilayer films with film layers drawn in different directions further improve barrier properties. Since oxygen can potentially migrate from the plastic substrate, the oxygen barrier also serves to prevent oxygen contained in the substrate from migrating into and contaminating the electrochromic material.

According to one embodiment of the present invention, chamber 208 contains a free-standing gel that cooperatively interacts with plastic elements 202 and 204 to produce a mirror that acts as one thick unitary member rather than two plastic elements held together only by a sealing member.

As used herein, the term electrochromic medium includes electrochromic anodic and cathodic materials that can be grouped into the following categories:

(i) Single layer—the electrochromic medium is a single layer of material which may include small nonhomogeneous regions and includes solution-phase devices where a material is contained in solution in the ionically conducting electrolyte and remains in solution in the electrolyte when electrochemically oxidized or reduced. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570, entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

At least three electroactive materials, at least two of which are electrochromic, can be combined to give a pre-selected color as described in U.S. patent application No. 08/832,596, entitled "AN IMPROVED ELECTROCHROMIC MEDIUM CAPABLE OF PRODUCING A PRE-SELECTED COLOR." This ability to select the color of the electrochromic medium is particularly advantageous when designing architectural windows.

To further protect the device against degradation due to oxygen permeation through the substrates, it may be beneficial to have the electrochromic medium comprise an anodic material that is not strongly colored in its oxidized form such that when oxygen enters and oxidizes the anodic material the electrochromic medium does not become objectionably colored. U.S. patent application Ser. No. 09/377,455, entitled "COLOR-STABILIZED ELECTROCHROMIC DEVICES" describes this and other color-stabilizing techniques and is hereby incorporated by reference.

The anodic and cathodic materials can be combined or linked by a bridging unit as described in International Application No. PCT/WO97/EP498 entitled "ELECTROCHROMIC SYSTEM." It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862, entitled "ELECTROCHROMIC POLYMER SYSTEM" or International Patent Application No. PCT/US98/05570, entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

As stated above, it is often desirable in the construction of electrochromic devices to incorporate thinner glass (or plastics) in order to decrease the overall weight of the device so that the mechanisms used to manipulate the orientation of the device are not overloaded. Decreasing the weight of the device also improves the dynamic stability of the device when exposed to vibrations. Electrochromic devices incorporating a solution-phase electrochromic medium and two thin glass elements suffer from being flexible and prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201, entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

During operation, light rays enter through the front element 202, the transparent conductive layer(s) 210, the electrochromic medium containing at least one electrochromic material in chamber 208, the transparent conductive layer 211 and the back element 204 before being reflected from the reflector 214 (when implemented as a mirror) provided on fourth surface 209 of electrochromic assembly 200. Light in the reflected rays exit by the same general path traversed in the reverse direction. Both the entering rays and the reflected rays are attenuated in proportion to the degree to which the electrochromic medium is light absorbing. Preferably, as stated above, the reflector may be placed on third surface 207 in accordance with the disclosure of U.S. Pat. No. 5,818,625, entitled "ELECTROCHROMIC REARVIEW MIRROR INCORPORATING A THIRD SURFACE METAL REFLECTOR," the disclosure of which is incorporated herein by reference. In this case, the third surface reflector doubles as an electrode and the transparent conductive layer 211 may optionally be deleted. Further, if the reflector is placed on the third surface 207, a heater (replaces reflector 214) may be placed on the fourth surface 209 in accordance with the teachings in the immediately above-referenced U.S. patent.

In accordance with yet another embodiment of the present invention, an additional advantage of plastic element construction is improved optical image quality for non-planar, aspheric and all electrochromic mirrors that are not flat. It is difficult to reproducibly bend glass and obtain identical local and global radii of curvature for each pair of glass elements. Historically, electrochromic mirrors have been made by bonding two glass elements together in a nominally parallel, planar and spaced-apart relationship. Any deviation from parallelism manifests itself as distortion, double image and non-uniform spacing between the two glass elements. The double image phenomena is due to mismatch in the curvature of the glass elements which results in misalignment between the residual and secondary reflections from the front glass element and its transparent conductive coating and the reflections from the main reflector layer. This is extensively discussed in above-referenced U.S. Pat. No. 5,818,625.

However, with injected molded plastics, it is possible to create elements with nearly identical local and global radii of curvature. Additionally, one of the elements can be glass and a plastic element can be formed, utilizing the glass element, to have a nearly identical local and global radii of curvature. Thus, electrochromic assemblies using one or more plastic elements are not nearly as prone to distortion as those produced entirely with glass.

The electrochromic assemblies of FIGS. 3–10 advantageously retain the front and rear elements at a rigid fixed distance (at the periphery) with respect to each other. Since some of the layers of the assemblies in FIGS. 3–10 are very thin, the scale has been distorted for pictorial clarity. Variations of many of the assemblies described below could be implemented, for example, in inside or outside automobile mirrors, sunglasses, vanity mirrors, camera lenses, projection lenses, windows, sunroofs or binoculars.

Figure 3:
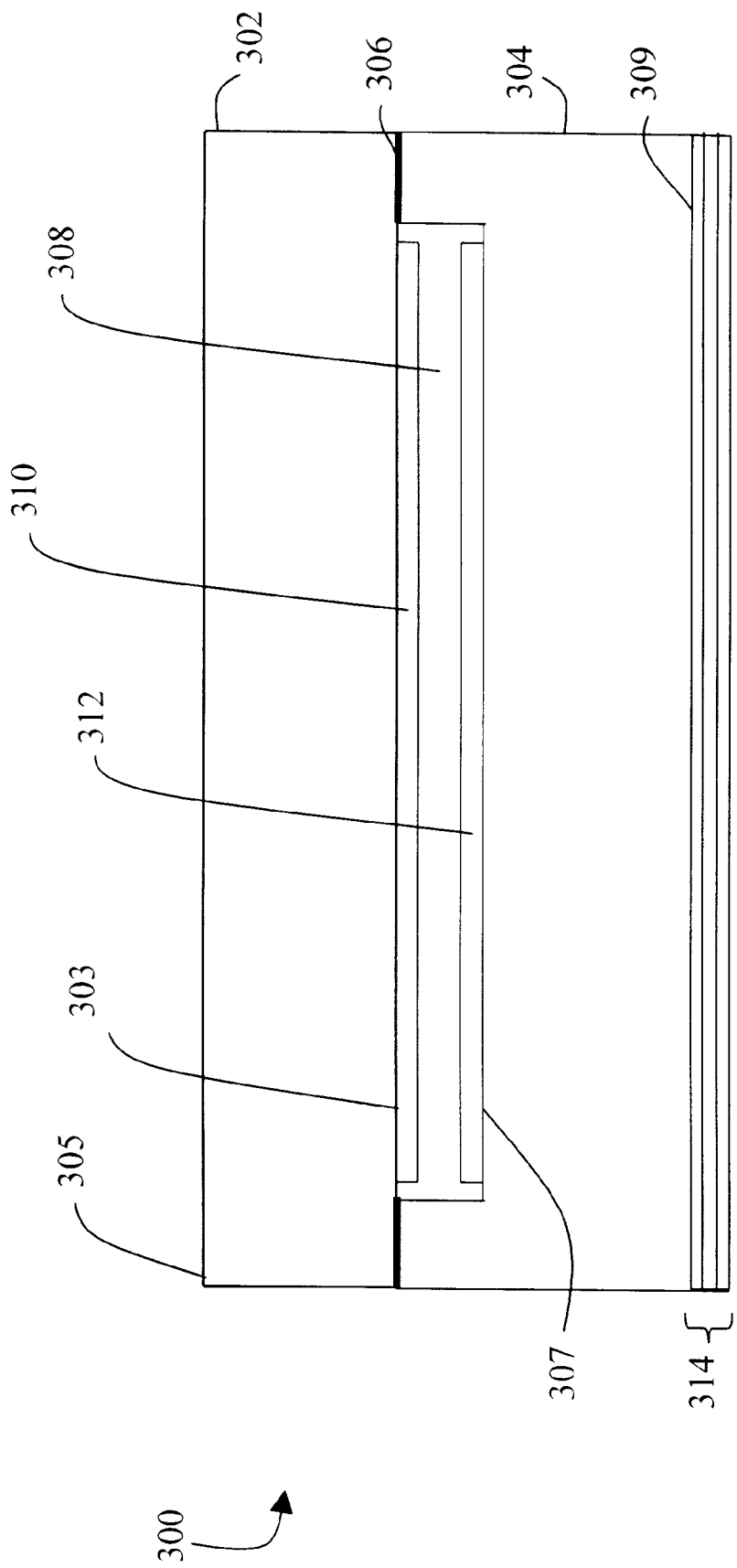
FIG. 3 is an enlarged cross-sectional view of an electrochromic assembly incorporated within, for example, the rearview mirror of FIG. 1 taken on the line A–A' thereof, according to an embodiment of the present invention.

FIG. 3 depicts an electrochromic assembly 300, according to an embodiment of the present invention. Electrochromic assembly 300 includes a plastic front element 302 and a plastic rear element 304. Preferably, front and rear elements 302 and 304 each include a scratch resistant oxygen barrier layer (not shown separately) incorporated into the outer surfaces of the substrates. Front and rear elements 302 and 304 are sealably bonded in a spaced apart relationship to define a chamber 308. This can be accomplished by joining front and rear elements 302 and 304 by various welding techniques (e.g., thermal, ultrasonic or laser welding) or by using adhesives or other mechanical techniques, such as, with a grommet. In laser welding, the area to be welded is treated with a material (e.g., carbon) that causes the laser to be absorbed and heat generated in the seal area to form a seal 306.

A rear surface 303 of front element 302 may include one or more layers of transparent electrode material 310. A front surface 307 of rear element 304 includes one or more layers of transparent electrode material 312 and/or a reflective coating (that serves as both a reflector and an electrode). If a transparent electrode material 312 is deposited on a front surface 307 of rear element 304, then one or more layers of a reflective coating 314 (with one or more layers) is deposited on a rear surface 309 of element 304 (when electrochromic assembly 300 is a mirror). Chamber 308 includes an electrochromic medium that changes transmissivity based upon a voltage applied to the electrodes 310 and 312. When electrochromic assembly 300 is an outside rearview mirror with a third surface reflector, rear element 304 can be molded to attach directly to a motor drive, obviating the need for a separate carrier plate. Additionally, rear element 304 can be molded to include a receptacle for receiving a printed circuit board (PCB).

Figure 4:
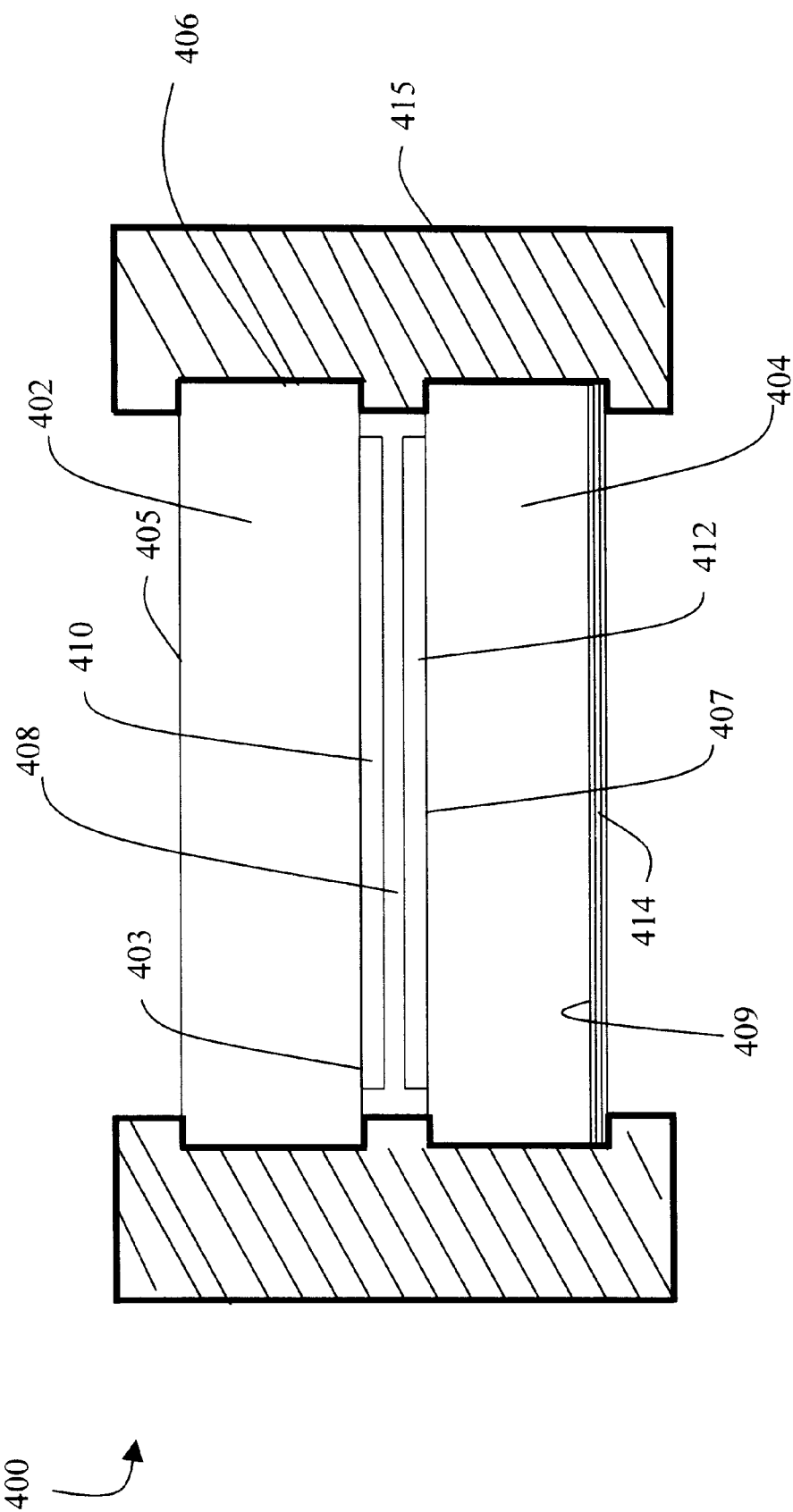
FIG. 4 is an enlarged cross-sectional view of an electrochromic assembly incorporated within, for example, the rearview mirror of FIG. 1 taken on the line A–A' thereof, according to an embodiment of the present invention.

FIG. 4 depicts an electrochromic assembly 400, according to an embodiment of the present invention. Electrochromic assembly 400 includes a plastic front element 402 and a plastic rear element 404. Preferably, front and rear elements 402 and 404 each include a scratch resistant oxygen barrier layer (not shown separately) incorporated into the outer surfaces of the substrates. Front and rear elements 402 and 404 are retained and sealably bonded to a structure 415 in a spaced apart relation ship to define a chamber 408. Structure 415 can be molded as desired and can, for example, be shaped to act as a bezel, a grommet or a housing. A seal 406 can be formed by welding, in a manner similar to formation of seal 306 of FIG. 3 (in which case, structure 415 is construc ted of a electrochromic solvent resistant plastic which preferably includes an oxygen barrier layer on all surfaces), or can be an epoxy based seal as discussed in conjunction with FIG. 2.

A rear surface 403 of front element 402 may include one or more layers of transparent electrode material 410. A front surface 407 of rear element 404 includes one or more layers of transparent electrode material 412 and/or a reflective coating (that serves as both a reflector and an electrode). If a transparent electrode material 412 is deposited on a front surface 407 of rear element 404, then one or more layers of a reflective coating 414 (with one or more layers) is deposited on a rear surface 409 of element 404 (when electrochromic assembly 400 is a mirror). Chamber 408 includes an electrochromic medium that changes transmissivity based upon a voltage applied to the electrodes 410 and 412. An advantage of electrochromic assembly 400 is that it snaps together, thus simplifying manufacturing.

Figure 5:
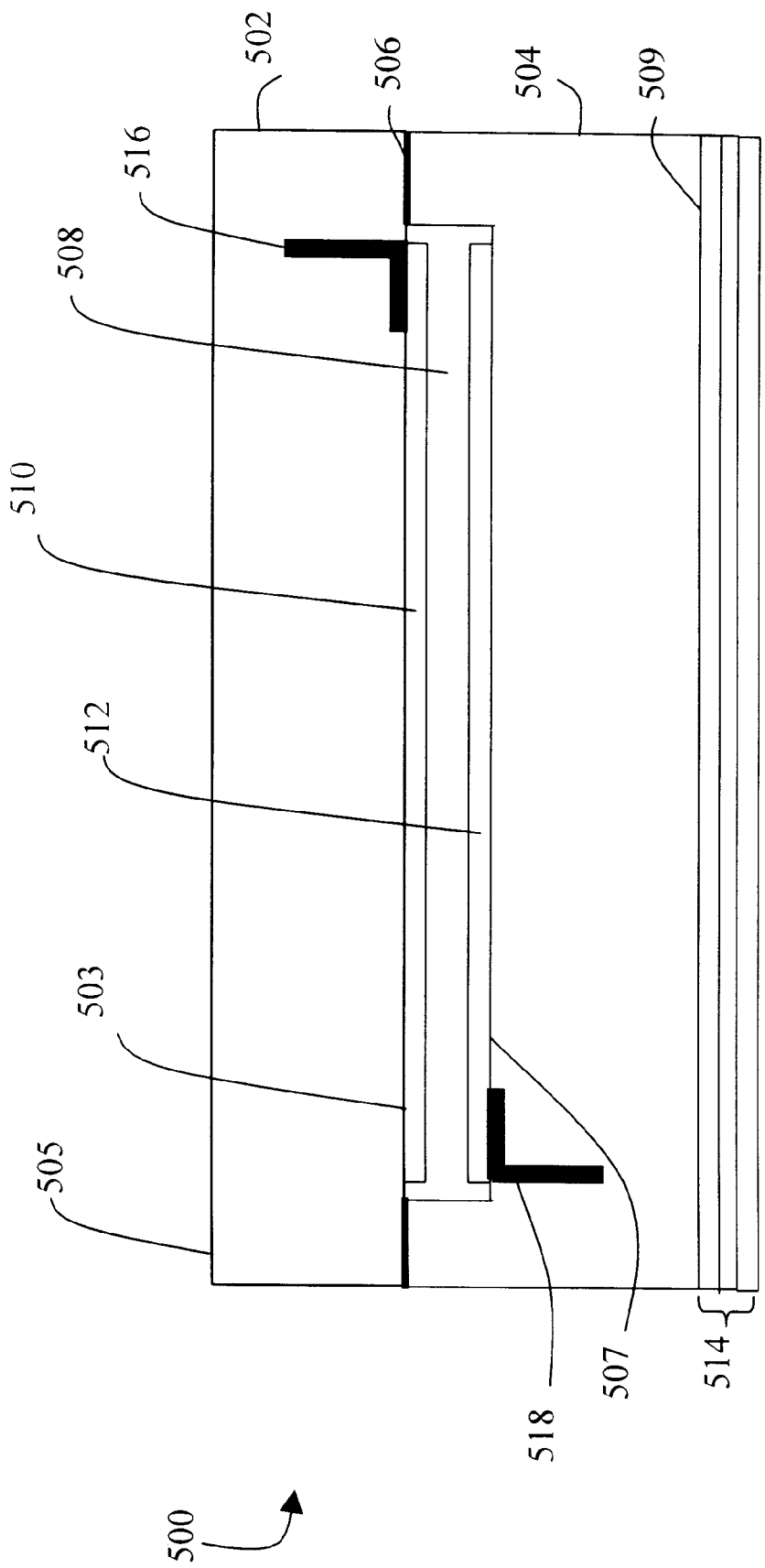
FIG. 5 is an enlarged cross-sectional view of an electrochromic assembly incorporated within, for example, the rearview mirror of FIG. 1 taken on the line A–A' thereof, according to an embodiment of the present invention.

FIG. 5 depicts an electrochromic assembly, according to another embodiment of the present invention. An electrochromic assembly 500 includes a plastic front element 502 and a plastic rear element 504. Front and rear elements 502 and 504 each include a scratch resistant oxygen barrier layer (not shown separately) on all surfaces. Front and rear elements 502 and 504 are sealably bonded 506 to define a chamber 508. As above, this is accomplished by joining the front and rear elements by various welding techniques (e.g., thermal, ultrasonic or laser welding).

A rear surface 503 of front element 502 may include one or more layers of transparent electrode material 510. A front surface 507 of rear element 504 includes one or more layers of transparent electrode material 512 and/or a reflective coating (that serves as both a reflector and an electrode). If a transparent electrode material 512 is deposited on a front surface 507 of rear element 504, then one or more layers of a reflective coating 514 (with one or more layers) is deposited on a rear surface 509 of element 504 (when electrochromic assembly 500 is a mirror). A contact 516 connects at one end to electrode material 510. A contact 518 connects at one end to electrode material 512. As shown, contacts 516 and 518 are insertion molded into elements 502 and 504. Chamber 508 includes an electrochromic medium that changes transmissivity based upon a voltage applied to the electrodes 516 and 518 and hence, electrode materials 510 and 512. An advantage of electrochromic assembly 500 is that it allows contacts 516 and 518 to be molded into elements 502 and 504, thus providing an assembly that is more readily producible than an assembly utilizing glass elements.

Figure 6:
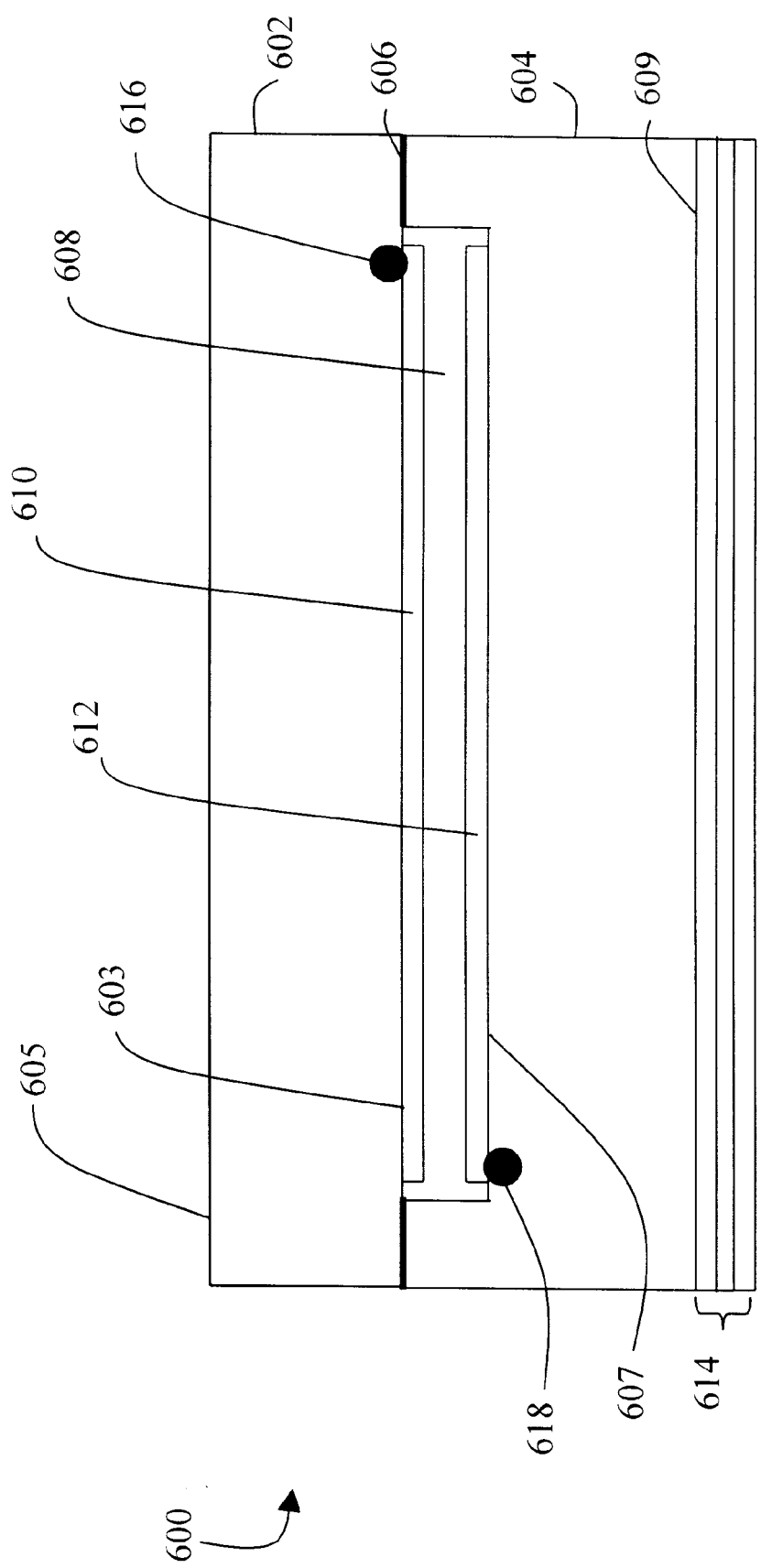
FIG. 6 is an enlarged cross-sectional view of an electrochromic assembly incorporated within, for example, the rearview mirror of FIG. 1 taken on the line A–A' thereof, according to an embodiment of the present invention.

FIG. 6 depicts yet another electrochromic assembly, which can be a window or a mirror, according to an embodiment of the present invention. Electrochromic assembly 600 includes a plastic front element 602 and a plastic rear element 604. In the preferred embodiment, front and rear elements 602 and 604 each include a scratch resistant oxygen barrier layer (not shown separately) serving as the outer surface of the substrates. Front and rear elements 602 and 604 are sealably bonded 606 to define a chamber 608. As above, this may be accomplished by joining the front and rear elements by various welding techniques (e.g., thermal, ultrasonic or laser welding).

A rear surface 603 of front element 602 may include one or more layers of transparent electrode material 610. A front surface 607 of rear element 604 includes one or more layers of transparent electrode material 612 and/or a reflective coating (that serves as both a reflector and an electrode). If a transparent electrode material 612 is deposited on a front surface 607 of rear element 604, then one or more layers of a reflective coating 614 (with one or more layers) is deposited on a rear surface 609 of element 604 (when electrochromic assembly 600 is a mirror). A contact 616 connects at one end to electrode material 610. A contact 618 connects at one end to electrode material 612. As shown, contacts 616 and 618 are mechanically or thermally imbedded into elements 602 and 604 after molding. Chamber 608 includes an electrochromic medium that changes transmissivity based upon a voltage applied to the electrodes 616 and 618, and hence electrode materials 610 and 612. An advantage of electrochromic assembly 600 is that it allows contacts 616 and 618 to be thermally or mechanically embedded into elements 502 and 504, thus providing an assembly that is more readily producible than an assembly utilizing glass elements.

Figure 7:
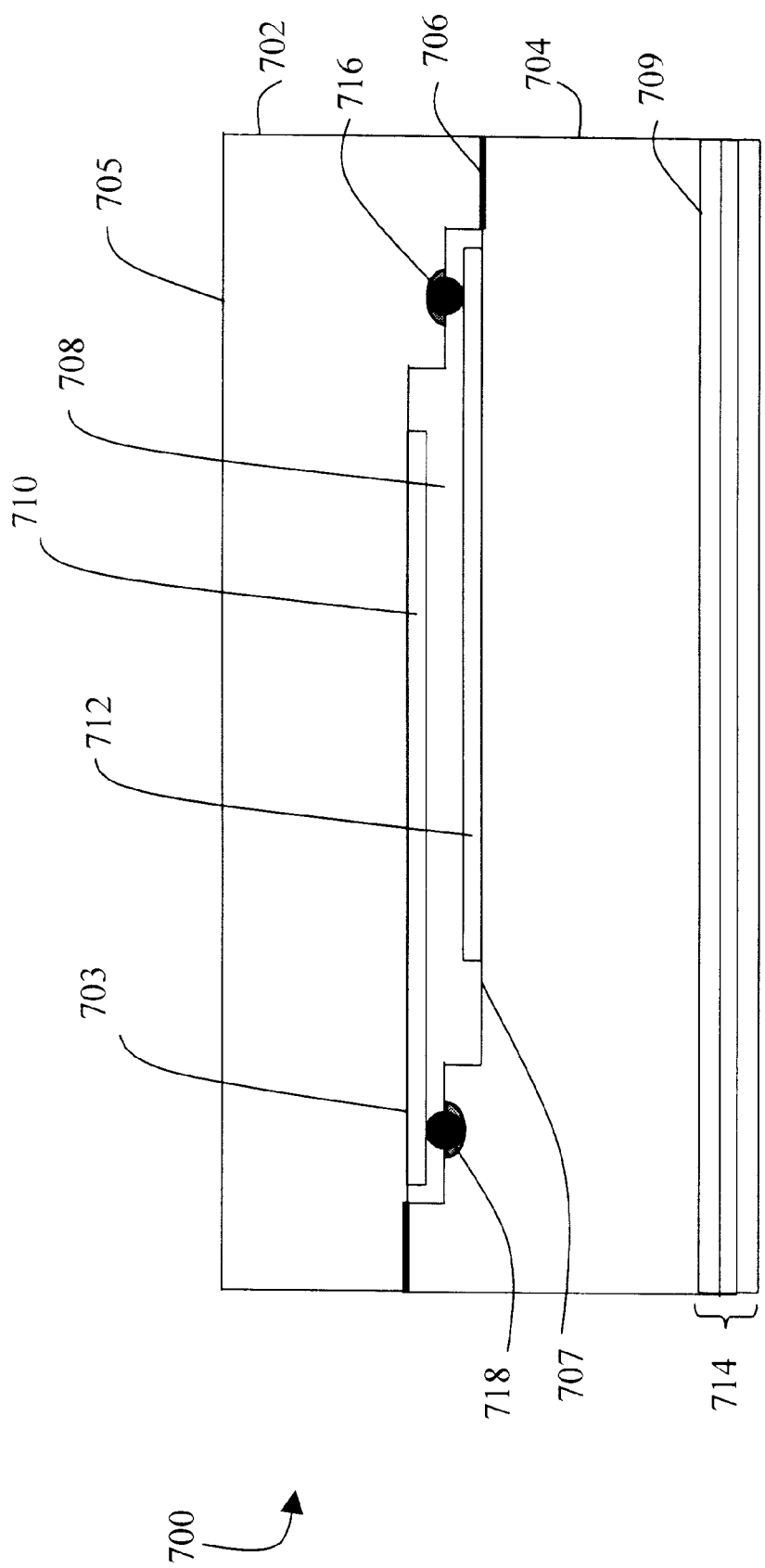
FIG. 7 is an enlarged cross-sectional view of an electrochromic assembly incorporated within, for example, the rearview mirror of FIG. 1 taken on the line A–A' thereof, according to an embodiment of the present invention.

FIG. 7 is an electrochromic assembly 700, which can be a mirror or a window, according to an embodiment of the present invention. Electrochromic assembly 700 includes a plastic front element 702 and a plastic rear element 704. In the preferred embodiment, front and rear elements 702 and 704 each include a scratch resistant oxygen barrier layer (not shown separately) serving as the outer surface of the substrates. Front and rear elements 702 and 704 are sealably bonded 706 to define a chamber 708. As above, this is accomplished by joining the front and rear elements by various welding techniques (e.g., thermal, ultrasonic or laser welding).

A rear surface 703 of front element 702 may include one or more layers of transparent electrode material 710. A front surface 707 of rear element 704 includes one or more layers of transparent electrode material 712 and/or a reflective coating (that serves as both a reflector and an electrode). If a transparent electrode material 712 is deposited on a front surface 707 of rear element 704, then one or more layers of a reflective coating 714 (with one or more layers) is deposited on a rear surface 709 of element 704 (when electrochromic assembly 700 is a mirror). A contact 716 connects at one end to electrode material 710. A contact 718 connects at one end to electrode material 712. As shown, contacts 716 and 718, which may be bare wires, are retained by elements 702 and 704 when sealed together. Chamber 708 includes an electrochromic medium that changes transmissivity based upon a voltage applied to the electrodes 716 and 718, and hence electrode materials 710 and 712. An advantage of electrochromic assembly 700 is that it allows contacts 716 and 718 to be retained while elements 702 and 704 are joined, thus providing an assembly that is more readily producible than an assembly utilizing glass elements.

Figure 8:
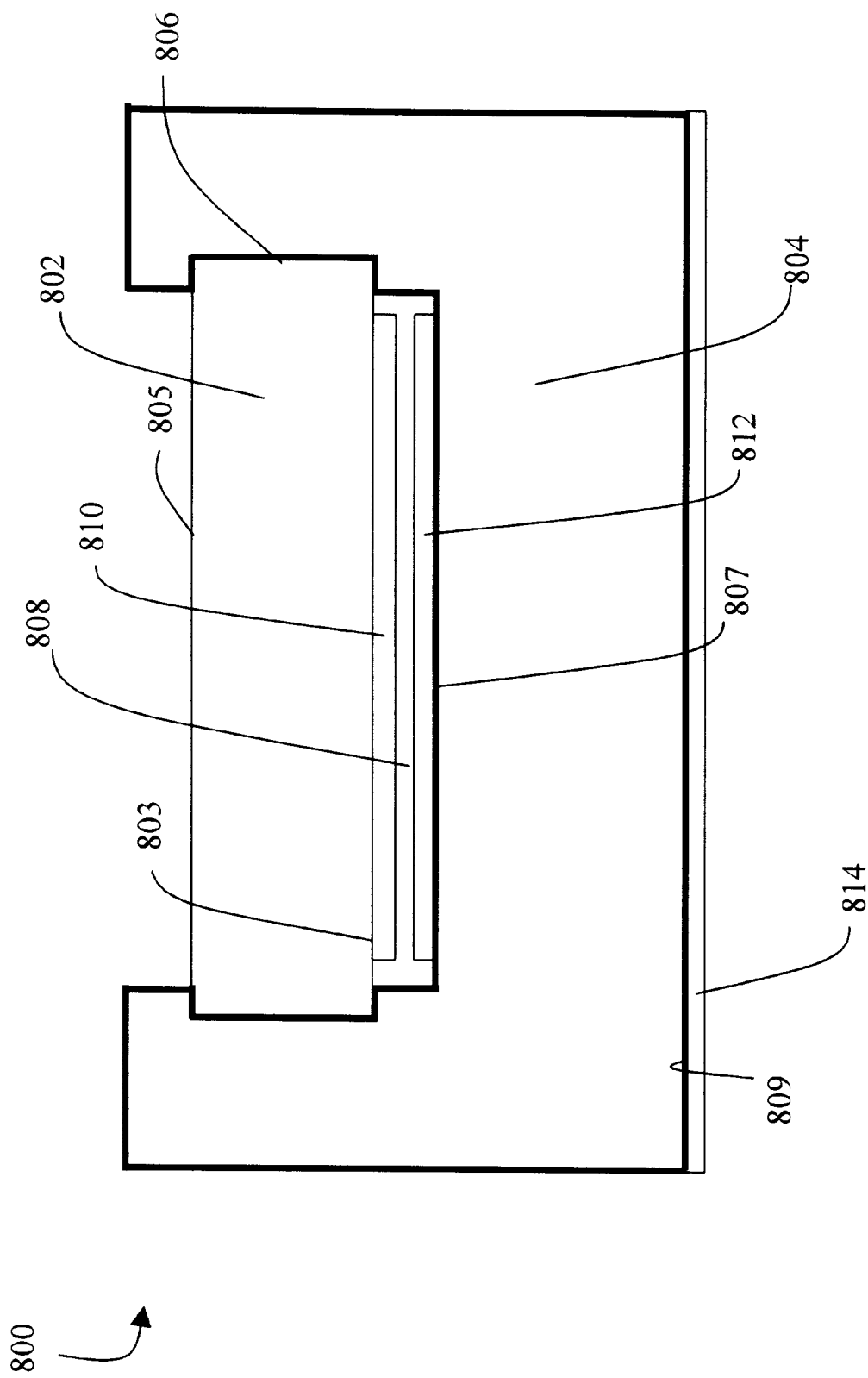
FIG. 8 is an enlarged cross-sectional view of an electrochromic assembly incorporated within, for example, the rearview mirror of FIG. 1 taken on the line A–A' thereof, according to an embodiment of the present invention.

FIG. 8 depicts an electrochromic assembly (window or mirror), according to yet another embodiment of the present invention. An electrochromic assembly 800 includes a front element 802 (that can be plastic or glass) and a plastic rear element 804 that retains front element 802. If desired, rear element 804 could be thermally expanded to aid in assembly. In addition, a rear element can include mounting points, etc. Preferably, when both front and rear elements 802 and 804 are plastic, each include a scratch resistant oxygen barrier layer (not shown separately) serving as the outer surface of the substrates. Front and rear elements 802 and 804 are sealably bonded by a seal 806 in a spaced apart relationship to define a chamber 808. If front element 802 is plastic, seal 806 can be formed by various welding techniques (e.g., thermal, ultrasonic or laser welding) or can be an epoxy-based seal as discussed in conjunction with FIG. 2.

A rear surface 803 of front element 802 may include one or more layers of transparent electrode material 810. A front surface 807 of rear element 804 includes one or more layers of transparent electrode material 812 and/or a reflective coating (that serves as both a reflector and an electrode). If a transparent electrode material 812 is deposited on a front surface 807 of rear element 804, then one or more layers of a reflective coating 814 (with one or more layers) is deposited on a rear surface 809 of element 804 (when electrochromic assembly 800 is a mirror). Chamber 808 includes an electrochromic medium that changes transmissivity based upon a voltage applied to the electrodes 810 and 812. An advantage of electrochromic assembly 800 is that rear element 804, which retains front element 802, can be molded to act as a carrier plate or housing. Additionally, front element 802 can be snapped into rear element 804 (which can be plastic or glass), thus providing an assembly that is mechanically held together, without outside force, while sealing is initiated.

Figure 9:
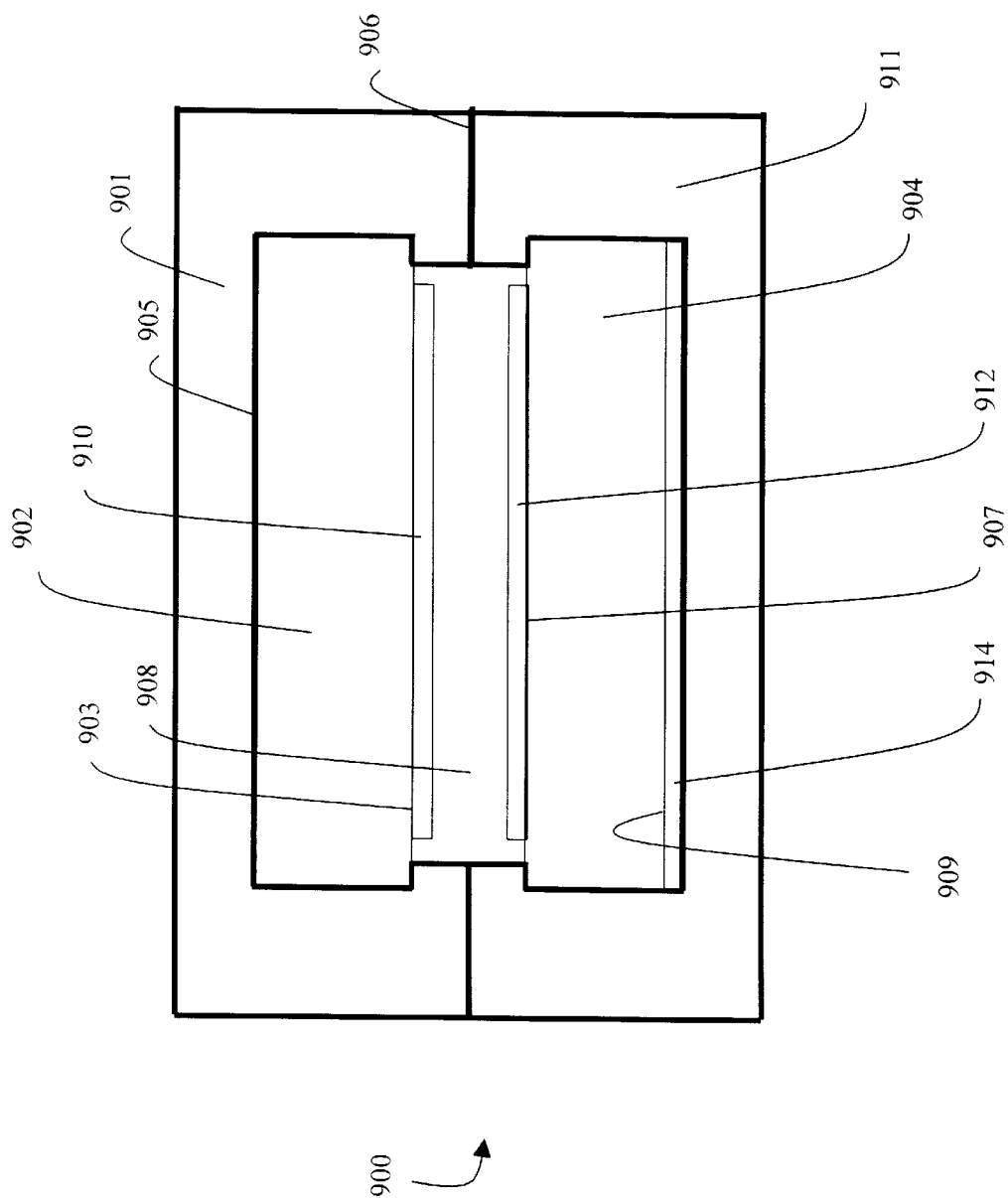
FIG. 9 is an enlarged cross-sectional view of an electrochromic assembly incorporated within, for example, the rearview mirror of FIG. 1 taken on the line A–A' thereof, according to an embodiment of the present invention.

FIG. 9 depicts an electrochromic assembly (mirror or window), according to an embodiment of the present invention. Electrochromic assembly 900 includes a glass front element 902 and a glass rear element 904 that is encased by a plastic front element 901 and a plastic rear element 911. Preferably, both front and rear elements 901 and 911 each include a scratch resistant oxygen barrier layer (not shown separately) incorporated within and acting as the outer surface of the substrates. Front and rear elements 901 and 911 are sealably bonded by a seal 906 in a spaced apart relationship to define a chamber 908. Seal 906 is formed by various welding techniques (e.g., thermal, ultrasonic or laser welding) as discussed above in conjunction with FIG. 3.

This configuration allows glass elements to be utilized while still providing for the latitude of plastic assembly techniques. This assembly may prove especially useful as a skylight, a residential window, a commercial window, an industrial window, an airplane window, a train window, an automobile sunroof, an automobile window or an interior privacy window (for an office, limousines, etc.).

A rear surface 903 of front element 902 may include one or more layers of transparent electrode material 910. A front surface 907 of rear element 904 includes one or more layers of transparent electrode material 912 and/or a reflective coating (that serves as both a reflector and an electrode). If a transparent electrode material 912 is deposited on a front surface 907 of rear element 904, then one or more layers of a reflective coating 914 (with one or more layers) is deposited on a rear surface 909 of element 904 (when electrochromic assembly 900 is a mirror). Chamber 908 includes an electrochromic medium that changes transmissivity based upon a voltage applied to the electrodes 910 and 912. An advantage of electrochromic assembly 900 is that glass elements 902 and 904 can be utilized, while still providing an assembly that can be sealed using various plastic welding techniques.

Figure 10:
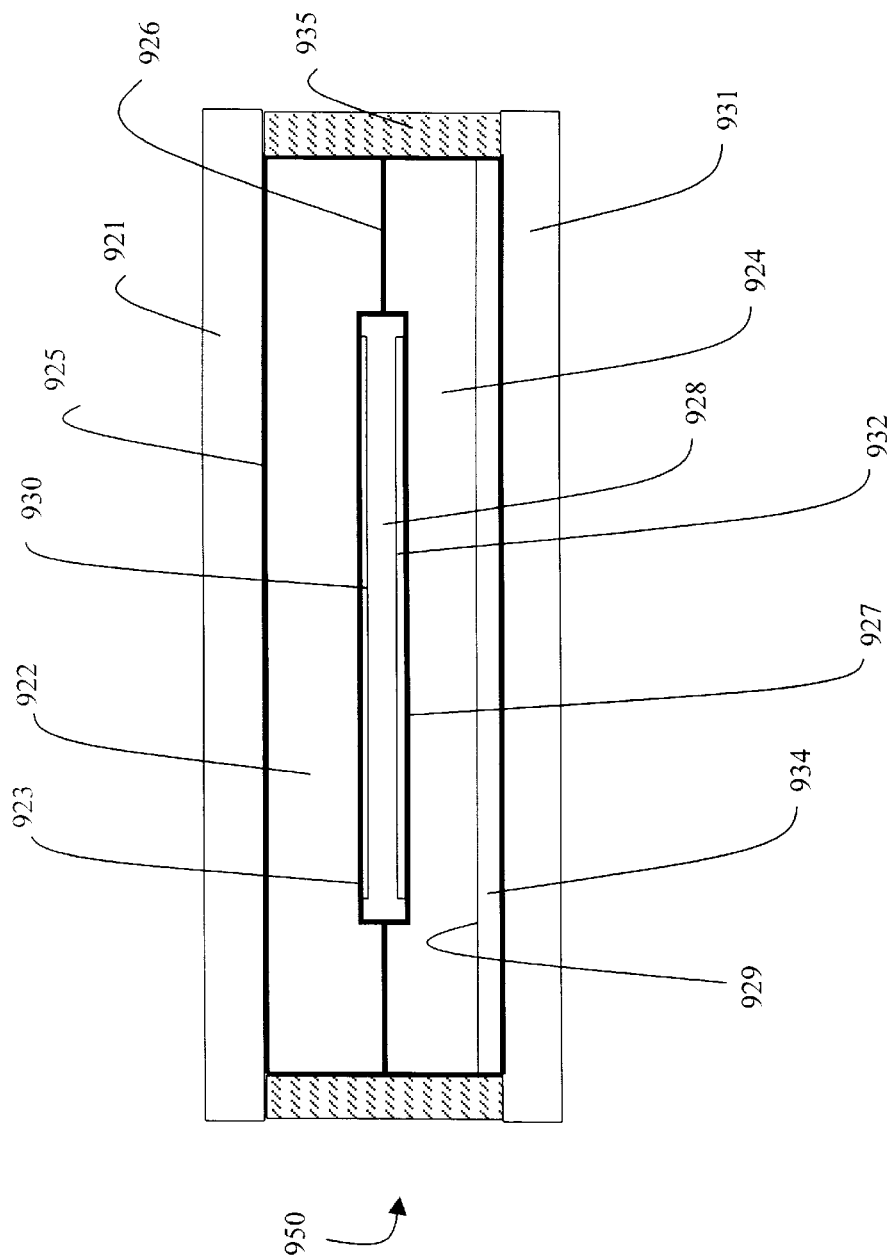
FIG. 10 is an enlarged cross-sectional view of an electrochromic assembly incorporated within, for example, the rearview mirror of FIG. 1 taken on the line A–A' thereof, according to an embodiment of the present invention.

FIG. 10 depicts an electrochromic assembly 950 according to an embodiment of the present invention. Electrochromic assembly 950 includes a plastic front element 922 and a plastic rear element 924. Assembly 950 also includes a glass front element 921 attached (e.g., laminated) to a front surface 925 of front element 922 and a glass rear element 931 attached (e.g., laminated) to a rear surface 929 (or reflector 934, when implemented) of rear element 924. Preferably, both front and rear elements 922 and 924 each include a scratch resistant oxygen barrier layer (not shown) incorporated within and acting as the outer surface of the substrates. Front and rear elements 922 and 924 are sealably bonded by a seal 926 in a spaced apart relationship to define a chamber 928. Seal 926 is formed by various welding techniques (e.g., thermal, ultrasonic or laser welding) as discussed above in conjunction with FIG. 3. This configuration is most advantageous in architectural glass applications as it allows glass elements to be utilized for architectural reasons, while still providing for the latitude of plastic assembly techniques.

A rear surface 923 of front element 922 may include one or more layers of transparent electrode material 930. A front surface 927 of rear element 924 includes one or more layers of transparent electrode material 932 and/or a reflective coating (that serves as both a reflector and an electrode). If a transparent electrode material 932 is deposited on a front surface 927 of rear element 924, then one or more layers of a reflective coating 934 (with one or more layers) is deposited on a rear surface 929 of element 924 (when electrochromic assembly 950 is a mirror). Chamber 928 includes an electrochromic medium that changes transmissivity based upon a voltage applied to the electrodes 930 and 932.

Figure 11A:
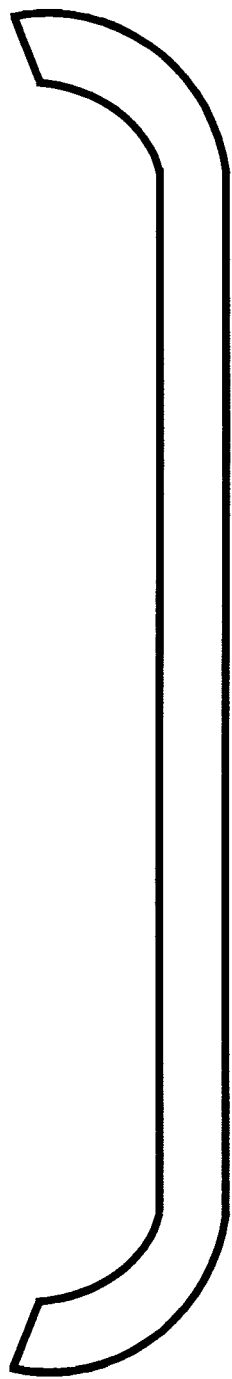
FIGS. 11A–B are top views of electrochromic mirrors with both flat and non-planar portions.
Figure 11B:
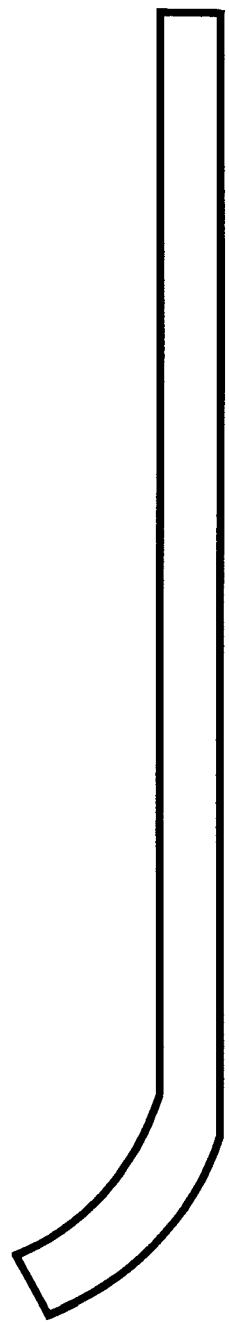

FIGS. 11A–B show a top view of an electrochromic assembly (implemented as an inside rearview mirror) in which the plastic front and rear elements are injection molded to a non-planar, convex shape using techniques known in the art. As is known, a convex mirror provides a wider viewing angle. Unfortunately, convex mirrors also create visual distortion (that is, reflected objects are closer than they appear). As the radius of curvature of the mirror is decreased, the viewing angle increases. However, decreasing the radius of curvature results in increased visual distortion. In the preferred embodiment, the inside mirror is generally planar across most of its surface and has a convex, curved end portion at one or both of its ends.

Figure 12:
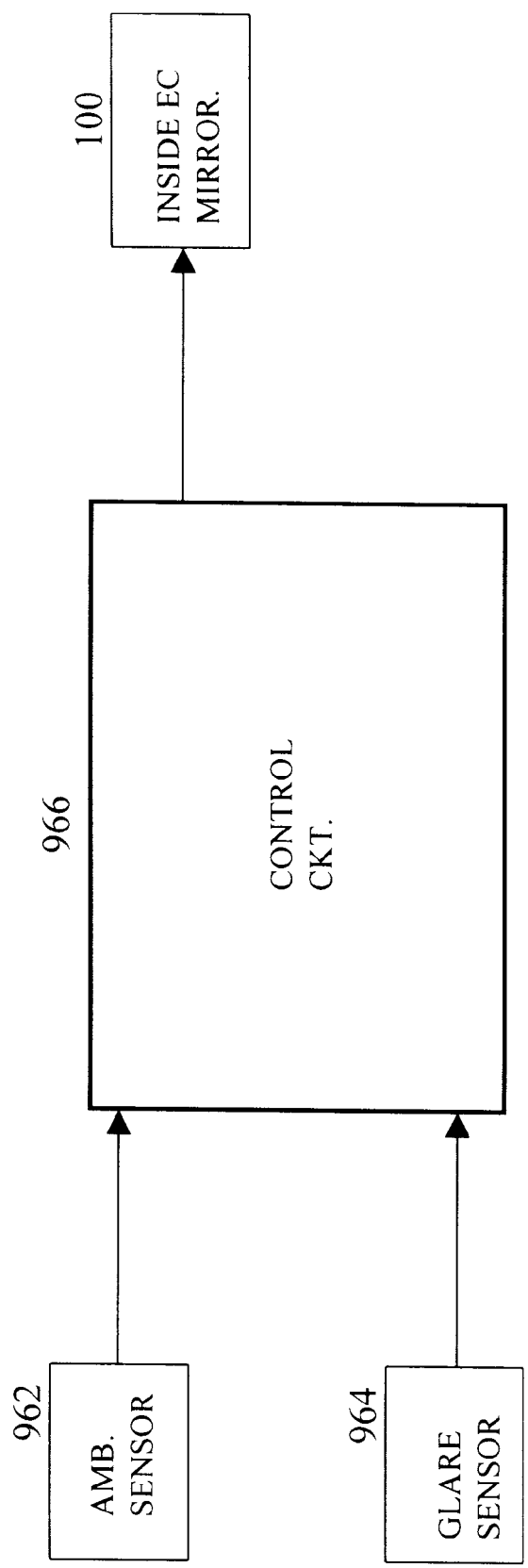
FIG. 12 is a block diagram of a control circuit that receives information from a light sensor and in response to that information controls the transmissivity of an electrochromic assembly, according to an embodiment of the present invention.

FIG. 12 depicts an ambient sensor 962 and glare sensor 964 which provide input to a control circuit 966 which controls, for example, electrochromic assembly 100. Control circuits for controlling electrochromic mirrors based on surrounding light levels are well known in the art. In response to the input from ambient sensor 962 and glare sensor 964, control circuit 966 provides control signals to the electrochromic assembly 100 such that the transmissivity of the electrochromic assembly 100 is adjusted.

Figure 13A:
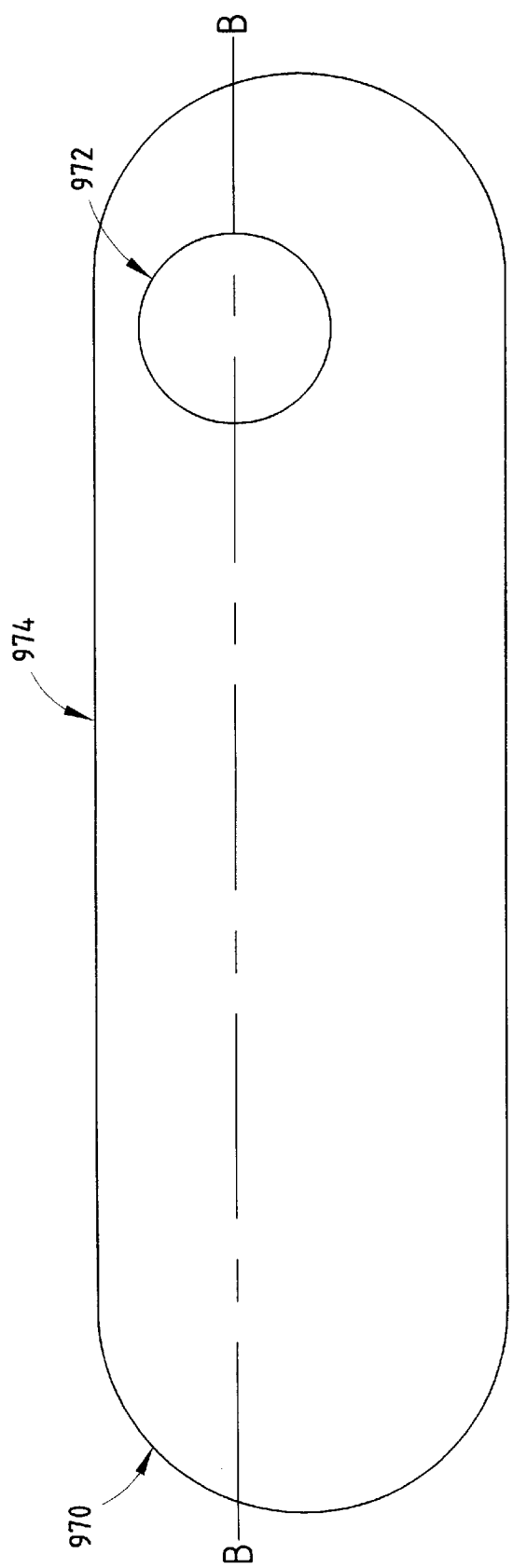
FIGS. 13A–B are views of an electrochromic assembly, implemented as a mirror, that includes a non-planar portion incorporated within a flat portion.
Figure 13B:
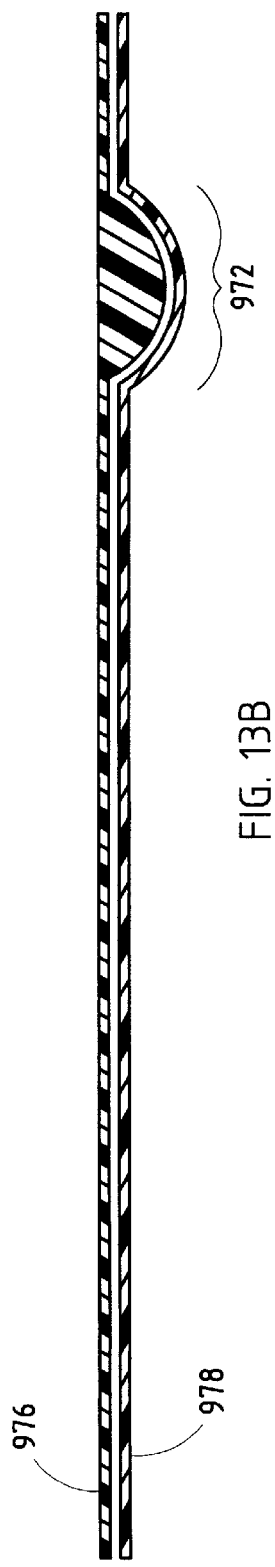

FIGS. 13A–B show an electrochromic assembly 970, implemented as a mirror. Assembly 970 includes a non-planar portion 972 incorporated within a flat portion 974. The non-planar portion 972 provides for a wide viewing angle and can be implemented in both interior and exterior mirrors, if desired. Electrochromic assembly 970 includes a plastic front element 978 and a plastic rear element 976. When the front element 978 is joined (e.g., welded) with the rear element 976, they form a one piece assembly. The one piece assembly eliminates the need for two separate mirror assemblies (e.g., a separate non-planar mirror that is joined to a separate flat mirror). FIG. 13A shows a front view of assembly 970 and FIG. 13B is a top view of assembly 970, section along the line B—B. While the sectioned view, shown in FIG. 13B, does not show one or more layers of a transparent conductive material, a reflective materiel or a combination reflector/electrode one of ordinary skill in the art will appreciate that these materials, among others, may be required to complete assembly 970, as partially described above.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electrochromic assembly, the electrochromic assembly comprising:
    a transparent front element and a rear element each having front and rear surfaces, wherein at least one of the front and rear elements is made from a material including aliphatic hydrocarbon that maintains physical integrity of said at least one of the front and rear elements when exposed to an organic solvent;
    a layer of transparent conductive material disposed on said rear surface of said front element; and
    a layer of conductive material disposed on said front surface of said rear element,
    wherein said front element and said rear element when joined form a chamber therebetween, where said chamber contains at least one electrochromic material in solution with the organic solvent, and where said electrochromic material is effective to attenuate light passing therethrough, and wherein said at least one of the front and rear elements include means for reducing oxygen permeability therethrough.

2. The electrochromic assembly of claim 1, wherein the organic solvent is an aprotic solvent.

3. The electrochromic assembly of claim 1, wherein said means for reducing oxygen permeability comprises an oxygen barrier on at least one surface of said one of the front and rear elements.

4. The electrochromic assembly of claim 3, wherein the oxygen barrier includes a scratch resistant barrier on at least the front surface of the front element.

5. The electrochromic assembly of claim 3, wherein the oxygen barrier includes a scratch resistant barrier on one surface of the rear element.

6. The electrochromic assembly of claim 3, wherein the oxygen barrier includes a scratch resistant barrier on each surface of the front and rear elements.

7. The electrochromic assembly of claim 3, wherein the oxygen barrier includes oriented polyolefin films.

8. The electrochromic assembly of claim 7, wherein the orientation of two of the oriented polyolefin films are at an angle relative to one another.

9. The electrochromic assembly of claim 1, wherein at least one of the front and rear elements is made of a material including aliphatic hydrocarbons.

10. The electrochromic assembly of claim 1, wherein at least one of the front and rear elements is made of a material including polyalkenes.

11. The electrochromic assembly of claim 10, wherein at least one of the front and rear elements is made of a material including polycyclicalkene.

12. The electrochromic assembly of claim 1, wherein at least one of the front and rear elements is made of a material including polyolefins.

13. The electrochromic assembly of claim 12, wherein at least one of the front and rear elements is made of a material including polycyclicolefin.

14. The electrochromic assembly of claim 1, wherein the front element and the rear element are joined by an epoxy seal.

15. The electrochromic assembly of claim 1, wherein the front and rear elements are plastic elements, and wherein the front element and the rear element are joined by a thermal, ultrasonic or laser weld.

16. The electrochromic assembly of claim 15, wherein the front and rear elements include an oxygen barrier on at least one surface.

17. The electrochromic assembly of claim 16, wherein the oxygen barrier includes a scratch resistant barrier.

18. The electrochromic assembly of claim 16, further comprising:
 a first glass element laminated to the front surface of the front element; and
 a second glass element laminated to the rear surface of the rear element.

19. The electrochromic assembly of claim 1, wherein the front and rear elements are plastic elements, and wherein the front element and the rear element are retained within a plastic bezel which forms a seal around the circumference of the front element and the rear element, the front element, the rear element and the plastic bezel maintaining their integrity when exposed to at least one of the organic solvent and a plastisizer.

20. The electrochromic assembly of claim 19, wherein the front element, the rear element and the plastic bezel include an oxygen barrier on at least one surface.

21. The electrochromic assembly of claim 1, wherein the front and rear elements are plastic elements that maintain their integrity when exposed to at least one of the organic solvent and a plastisizer, and wherein the front element is retained by the rear element which forms a seal around the circumference of the front element.

22. The electrochromic assembly of claim 21, wherein the front and rear elements include an oxygen barrier on at least one surface.

23. The electrochromic assembly of claim 1, wherein the front element and the rear element are non-planar.

24. The electrochromic assembly of claim 1, wherein the front and rear elements are plastic elements that maintain their integrity when exposed to the organic solvent, and wherein the front and rear elements each include a supplemental conductor that is imbedded in one of a mechanical and thermal manner through the respective element and is attached on one end to the respective conductive layer.

25. The electrochromic assembly of claim 24, wherein the front and rear elements include an oxygen barrier on at least one surface.

26. The electrochromic assembly of claim 1, wherein the front and rear elements are plastic elements that maintain their integrity when exposed to the organic solvent, and wherein the front element and the rear element each include a conductor that is insertion molded through the respective element and is attached on one end to the respective conductive layer.

27. The electrochromic assembly of claim 26, wherein the front and rear elements include an oxygen barrier on at least one surface.

28. The electrochromic assembly of claim 1, wherein a reflector is disposed on said rear surface of said rear element or said layer of conductive material disposed on said front surface of said rear element also acts as a reflector.

29. The electrochromic assembly according to claim 1, wherein the organic solvent is one of an ethylene carbonate, acrylonitrile, acetonitrile and dimethylformamide.

30. An electrochromic rearview mirror, the electrochromic rearview mirror comprising:
 an electrochromic assembly further including;
 a transparent front element and a rear element each having front and rear surfaces, wherein at least one of the front and rear elements is made from a material including aliphatic hydrocarbon that maintains physical integrity of said at least one of the front and rear elements when exposed to an organic solvent;
 a layer of transparent conductive material disposed on said rear surface of said front element; and
 a layer of conductive material disposed on said front surface of said rear element,
 wherein said front element and said rear element when joined form a chamber therebetween, where said chamber contains at least one electrochromic material in solution with at least one of an organic solvent and a plastisizer, and where said electrochromic material is effective to attenuate light passing into said chamber, and wherein said at least one of the front and rear elements include means for reducing oxygen permeability therethrough; and
 a housing for accepting and retaining the electrochromic assembly.

31. The electrochromic rearview mirror of claim 30, further including:
 a control circuit contained within the housing, the control circuit controlling the attenuation of light passing into the chamber of the electrochromic assembly based on surrounding light levels.

32. The electrochromic rearview mirror of claim 30, wherein said means for reducing oxygen permeability comprises an oxygen barrier on at least one surface of said one of the front and rear elements.

33. The electrochromic rearview mirror of claim 30, wherein at least one of the front and rear elements is made of a material including aliphatic hydrocarbons.

34. The electrochromic rearview mirror of claim 30, wherein at least one of the front and rear elements is made of a material including polyalkenes.

35. The electrochromic rearview mirror of claim 30, wherein at least one of the front and rear elements is made of a material including polyolefins.

36. The electrochromic rearview mirror of claim 30, wherein the front element and the rear element are joined by an epoxy seal.

37. The electrochromic rearview mirror of claim 30, wherein the front and rear elements are plastic elements that maintain their integrity when exposed to the at least one of the organic solvent and the plastisizer, and wherein the front element and the rear element are joined by a thermal, ultrasonic or laser weld.

38. The electrochromic rearview mirror of claim 37, wherein the front and rear elements include an oxygen barrier on at least one surface.

39. The electrochromic rearview mirror of claim 38, further comprising:
  a first glass element laminated to the front surface of the front element; and
  a second glass element laminated to the rear surface of the rear element.

40. The electrochromic rearview mirror of claim 30, wherein the front and rear elements are plastic elements, and wherein the front element and the rear element are retained within a plastic bezel which forms a seal around the circumference of the front element and the rear element, the front element, the rear element and the plastic bezel maintaining their integrity when exposed to the at least one of the organic solvent and the plastisizer.

41. The electrochromic rearview mirror of claim 40, wherein the front element, the rear element and the plastic bezel include an oxygen barrier on at least one surface.

42. The electrochromic rearview mirror of claim 30, wherein the front and rear elements are plastic elements that maintain their integrity when exposed to the at least one of the organic solvent and the plastisizer, and wherein the front element is retained by the rear element which forms a seal around the circumference of the front element.

43. The electrochromic rearview mirror of claim 37, wherein the front and rear elements include an oxygen barrier on at least one surface.

44. The electrochromic rearview mirror of claim 30, wherein the front element and the rear element are non-planar.

45. The electrochromic rearview mirror of claim 30, wherein the front and rear elements are plastic elements that maintain their integrity when exposed to the at least one of the organic solvent and the plastisizer, and wherein the front and rear elements each include a conductor that is imbedded in one of a mechanical and thermal manner through the respective element and is attached on one end to the respective conductive layer.

46. The electrochromic rearview mirror of claim 45, wherein the front and rear elements include an oxygen barrier on at least one surface.

47. The electrochromic rearview mirror of claim 30, wherein the front and rear elements are plastic elements that maintain their integrity when exposed to at least one of the organic solvent and a plastisizer, and wherein the front element and the rear element each include a conductor that is insertion molded through the respective element and is attached on one end to the respective conductive layer.

48. The electrochromic rearview mirror of claim 47, wherein the front and rear elements include an oxygen barrier on at least one surface.

49. The electrochromic rearview mirror of claim 30, wherein a reflector is disposed on said rear surface of said rear element or said layer of conductive material disposed on said front surface of said rear element also acts as a reflector.

50. The electrochromic rearview mirror of claim 30, wherein the organic solvent is at least one of an ethylene carbonate, acrylonitrile, acetonitrile and dimethylformamide.

* * * * *